United States Patent
Duan

(10) Patent No.: US 11,546,452 B2
(45) Date of Patent: Jan. 3, 2023

(54) MOBILE TERMINAL

(71) Applicant: VIVO MOBILE COMMUNICATION CO., LTD., Guangdong (CN)

(72) Inventor: Junjie Duan, Chang'an Dongguan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 0 days.

(21) Appl. No.: 17/092,092

(22) Filed: Nov. 6, 2020

(65) Prior Publication Data

US 2021/0058501 A1 Feb. 25, 2021

Related U.S. Application Data

(63) Continuation of application No. PCT/CN2019/085815, filed on May 7, 2019.

(30) Foreign Application Priority Data

May 7, 2018 (CN) .......................... 201810426294.2

(51) Int. Cl.
H04M 1/02 (2006.01)

(52) U.S. Cl.
CPC ....... H04M 1/0266 (2013.01); H04M 1/0264 (2013.01); H04M 1/0277 (2013.01)

(58) Field of Classification Search
None
See application file for complete search history.

(56) References Cited

U.S. PATENT DOCUMENTS

| 2009/0160823 | A1* | 6/2009 | Li | G06F 3/0421 345/175 |
| 2013/0114195 | A1* | 5/2013 | Lee | G06F 1/1671 361/679.01 |
| 2017/0176246 | A1 | 6/2017 | Jia et al. | |
| 2018/0211634 | A1* | 7/2018 | Zhou | G06F 1/3265 |
| 2019/0147214 | A1* | 5/2019 | Lee | H01L 51/0097 382/124 |

(Continued)

FOREIGN PATENT DOCUMENTS

| CN | 206179425 A | 5/2017 |
| CN | 106850898 A | 6/2017 |

(Continued)

OTHER PUBLICATIONS

Extended European Search Report dated May 20, 2021 as received in Application No. 19800361.8.

(Continued)

*Primary Examiner* — Quoc D Tran
(74) *Attorney, Agent, or Firm* — Maschoff Brennan

(57) ABSTRACT

A mobile terminal is provided in the present disclosure. The mobile terminal includes a cover plate, a display screen, a middle frame, an edge frame, and a photosensitive device, where the cover plate is fixedly connected to the edge frame, the display screen is located between the cover plate and the middle frame, a first gap is provided between the display screen and the edge frame, a second gap is provided between the middle frame and the edge frame, and the first gap and the second gap are connected to form an optical channel for the photosensitive device.

11 Claims, 2 Drawing Sheets

(56) References Cited

U.S. PATENT DOCUMENTS

| | | | | |
|---|---|---|---|---|
| 2019/0285720 A1* | 9/2019 | Zhang | ................... | G01J 1/4228 |
| 2019/0305403 A1* | 10/2019 | Wang | ..................... | H01Q 1/244 |
| 2019/0361120 A1 | 11/2019 | Li et al. | | |
| 2020/0014093 A1* | 1/2020 | Kim | ......................... | H01Q 1/44 |
| 2021/0058501 A1 | 2/2021 | Duan | | |

FOREIGN PATENT DOCUMENTS

| | | | | |
|---|---|---|---|---|
| CN | 106850982 | A | | 6/2017 |
| CN | 106873879 | A | | 6/2017 |
| CN | 206226512 | U | | 6/2017 |
| CN | 107122011 | A | | 9/2017 |
| CN | 107659688 | A | | 2/2018 |
| CN | 107770315 | A | * | 3/2018 |
| CN | 107770315 | A | | 3/2018 |
| CN | 107909922 | A | | 4/2018 |
| CN | 108600460 | A | | 9/2018 |
| CN | 109101083 | A | | 12/2018 |
| CN | 2087211790 | A | | 4/2019 |

OTHER PUBLICATIONS

CN Office Action in Application No. 201810426294.2 dated Oct. 30, 2019.
CN Search Report in Application No. 201810426294.2 dated Nov. 20, 2018.
Written Opinion and International Search Report in Application No. PCT/CN2019/085815 dated Nov. 19, 2020.

* cited by examiner

MOBILE TERMINAL

CROSS-REFERENCE TO RELATED APPLICATIONS

This application is a continuation application of International Application No. PCT/CN2019/085815 filed on May 7, 2019, which claims priority to Chinese Patent Application No. 201810426294.2, filed in China on May 7, 2018, both disclosures of which are incorporated herein by reference in their entireties.

TECHNICAL FIELD

This disclosure relates to the field of communications technologies, and in particular, to a mobile terminal.

BACKGROUND

With rapid development of mobile terminals, mobile terminals have become an indispensable tool in people's lives, and have brought great convenience to all aspects of users' lives. In the related art, there are some photosensitive devices, such as an infrared sensor or a photosensitive sensor, on a mobile terminal, and different photosensitive devices can implement different functions.

However, a photosensitive device of the mobile terminal in the related art is generally arranged on the front side of the mobile terminal, which limits a screen-to-body ratio of the whole terminal, resulting in a relatively low screen-to-body ratio of the mobile terminal.

SUMMARY

Embodiments of this disclosure provide a mobile terminal, to resolve a problem of a relatively low screen-to-body ratio of the mobile terminal because a photosensitive device of the mobile terminal is generally arranged on the front side of the mobile terminal.

To resolve the foregoing technical problem, this disclosure is implemented as follows: A mobile terminal includes a cover plate, a display screen, a middle frame, an edge frame, and a photosensitive device, where the cover plate is fixedly connected to the edge frame, the display screen is located between the cover plate and the middle frame, a first gap is provided between the display screen and the edge frame, a second gap is provided between the middle frame and the edge frame, and the first gap and the second gap are connected to form an optical channel for the photosensitive device.

In this way, due to existence of the optical channel, the photosensitive device does not need to be arranged on the front side of the mobile terminal, so that the screen-to-body ratio of the mobile terminal can be increased.

BRIEF DESCRIPTION OF DRAWINGS

To describe the technical solutions in the embodiments of this disclosure more clearly, the following briefly describes the accompanying drawings required for describing the embodiments of this disclosure. Apparently, the accompanying drawings in the following descriptions show merely some embodiments of this disclosure.

DESCRIPTION OF EMBODIMENTS

The following clearly describes the technical solutions in the embodiments of this disclosure with reference to the accompanying drawings in the embodiments of this disclosure. Apparently, the described embodiments are some rather than all of the embodiments of this disclosure. All other embodiments obtained by a person of ordinary skill in the art based on the embodiments of this disclosure without creative efforts shall fall within the protection scope of this disclosure.

Figure 1:
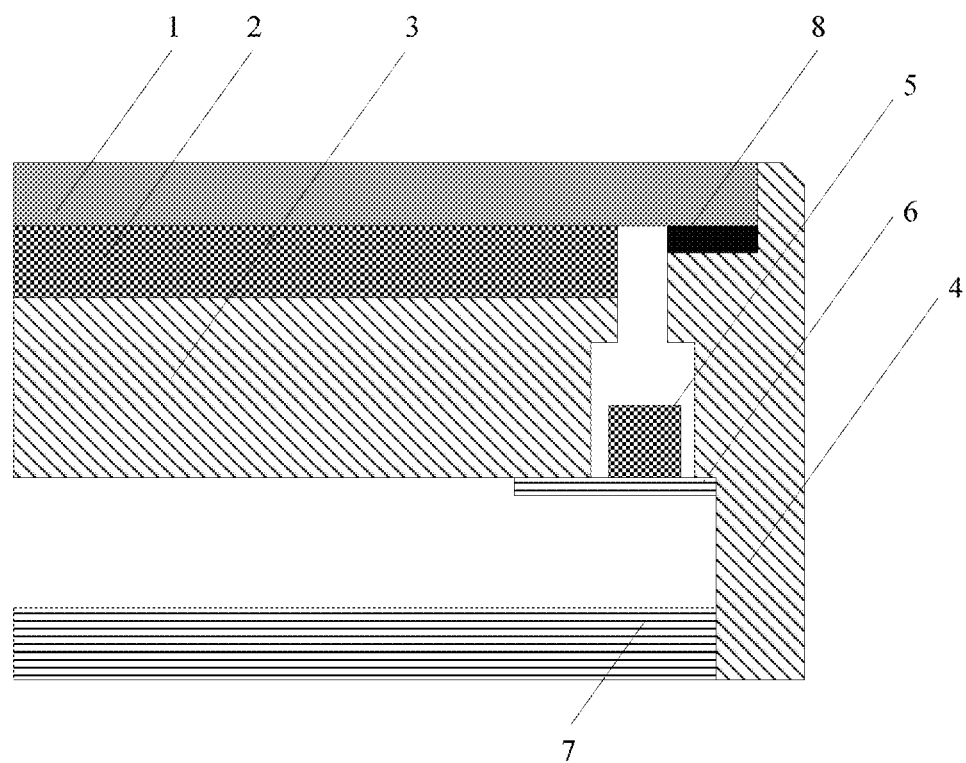
FIG. 1 is a schematic structural diagram of a mobile terminal according to an embodiment of this disclosure.

FIG. 1 is a schematic structural diagram of a mobile terminal according to an embodiment of this disclosure. As shown in FIG. 1, the mobile terminal includes a cover plate 1, a display screen 2, a middle frame 3, an edge frame 4, and a photosensitive device 5. The cover plate 1 is fixedly connected to the edge frame 4, the display screen 2 is located between the cover plate 1 and the middle frame 3, a first gap is provided between the display screen 2 and the edge frame 4, a second gap is provided between the middle frame 3 and the edge frame 4, and the first gap and the second gap are connected to form an optical channel for the photosensitive device 5.

In this embodiment, the mobile terminal may further include a circuit board 6 connected to the photosensitive device and a battery cover 7 connected to the edge frame. The mobile terminal may use the circuit board 6 to control some internal components of the mobile terminal, and use the battery cover 7 to enclose the internal components. The cover plate 1 may be a glass cover plate, or may be a cover plate made of another synthetic material, or the like. The display screen 2 may be a liquid crystal display screen, or may be a display screen made of a crystal diode. Materials of the middle frame 3 and the edge frame 4 may be metal, or may be some other synthetic materials, or the like. The photosensitive device 5 may be an infrared sensor, or may be a photosensitive sensor, or the like. Certainly, the photosensitive device 5 may alternatively be another photosensitive device. This is not limited in this embodiment of this disclosure.

In this embodiment, the first gap is provided between the display screen 2 and the edge frame 4, the second gap is provided between the middle frame 3 and the edge frame 4, and the first gap and the second gap are connected to form an optical channel for the photosensitive device 5. The first gap and the second gap are both assembly gaps, that is, structural gaps between the display screen, the middle frame, and the edge frame. In this way, light can reach the photosensitive device 5 through the optical channel, so that the photosensitive device 5 can receive the light, and the photosensitive device 5 can also send a signal outward through the optical channel.

In the related art, it is necessary to set up special assembly space for the photosensitive device 5 on a black border of the mobile terminal, which affects a screen-to-body ratio of the mobile terminal and makes it impossible to increase the screen-to-body ratio of the mobile terminal. However, in this embodiment, through a stacking design, a structural assembly gap (including the first gap and the second gap) is used as the optical channel of the photosensitive device 5, avoiding occupying visual space that is occupied in a longitudinal direction of the mobile terminal in the related art, so that the mobile terminal can have a relatively high screen-to-body ratio.

In this embodiment of this disclosure, the foregoing mobile terminal may be a mobile phone, a tablet computer (Tablet Computer), a laptop computer (Laptop Computer), a personal digital assistant (personal digital assistant, PDA), a mobile internet device (Mobile Internet Device, MID), a wearable device (Wearable Device), or the like.

Optionally, the photosensitive device 5 is arranged in the second gap.

In this implementation, the photosensitive device 5 is arranged in the second gap, so that there is no need to set up independent assembly space for the photosensitive device 5 on a black border of the mobile terminal, and only a structural assembly gap is required to achieve a relatively high screen-to-body ratio for the mobile terminal.

Optionally, the photosensitive device 5 is an infrared sensor, a transmit end 51 and a receive end 52 of the infrared sensor face the cover plate 1, and an infrared ray emitted by the infrared sensor may be emitted out of the cover plate 1 through the optical channel.

In this implementation, the photosensitive device 5 is the infrared sensor, so that the infrared sensor can also be designed to detect a distance when the mobile terminal has a high screen-to-body ratio. The transmit end 51 and the receive end 52 of the infrared sensor face the cover plate 1, and the emitted infrared ray may be emitted out of the cover plate 1 through the optical channel. When the infrared ray emitted by the transmit end 51 encounters an obstacle, the infrared ray can be reflected back and be received by the receive end 52. In this way, the distance is detected.

Optionally, the edge frame 4 is provided with a first step structure, the cover plate 1 is bonded to the first step structure through an adhesive layer 8, and the adhesive layer 8 includes a first side and a second side that are arranged oppositely, where the second side is a side close to the display screen 2, and the first gap is located between the second side and the display screen 2.

In this implementation, the edge frame 4 is provided with the first step structure, so that the cover plate 1 can be arranged on the first step structure, and the cover plate 1 can be well accommodated. The cover plate 1 is bonded to the first step structure through the adhesive layer 8, and the cover plate 1 can be well fixed on the first step structure. When being damaged, the cover plate 1 can be replaced easily.

Optionally, the mobile terminal further includes the circuit board 6, the infrared sensor is electrically connected to the circuit board 6, and the circuit board 6 is fixedly connected to the middle frame 3 and the edge frame 4.

In this implementation, the circuit board 6 may be a common circuit board, may be a flexible circuit board, or may be a reinforcing board of a flexible circuit board, or the like. The infrared sensor is electrically connected to the circuit board 6 to ensure that the infrared sensor can work well. The circuit board 6 may be fixedly connected, bonded, or connected by small screws, to the middle frame 3 and the edge frame 4.

Optionally, the edge frame 4 is provided with a second step structure, the circuit board 6 is fixedly connected to the second step structure, and the circuit board 6 is fixedly connected to a side, facing away from the display screen 2, of the middle frame 3.

In this implementation, the edge frame 4 is provided with the second step structure, the circuit board 6 is fixedly connected to the second step structure, and the circuit board 6 is fixedly connected to the side, facing away from the display screen 2, of the middle frame 3, so that the circuit board 6 can be well fixed to the middle frame 3 and the edge frame 4. Certainly, to better fasten the circuit board 6, a side of the middle frame 3 that is fixedly connected to the circuit board 6 and a side of the edge frame 4 that is fixedly connected to the circuit board may be on one plane, so that the circuit board 6 can be fastened more firmly.

Optionally, the infrared sensor is welded to the circuit board 6, and the circuit board 6 is electrically connected to a main board 9.

In this implementation, the infrared sensor is welded to the circuit board 6, so that the infrared sensor can be well fastened to the circuit board 6 and is not prone to loose due to some vibrations of the mobile terminal, thereby ensuring measurement accuracy of the infrared sensor.

In this implementation, the circuit board 6 is electrically connected to the main board 9, and the infrared sensor is electrically connected to the circuit board 6, so that the main board 9 remains connected to the infrared sensor, to further control the infrared sensor.

Optionally, the circuit board 6 is electrically connected to the main board 9 through a connector 10 or an elastic sheet.

In this implementation, the circuit board 6 is electrically connected to the main board 9 through the connector 10 or the elastic sheet, and the circuit board 6, the main board 9, and the infrared sensor remain connected to each other, so that the infrared sensor can be controlled through the main board 9. The connector 10 may be a board-to-board connector, or may be a zero insertion force connector, or the like.

Figure 2:
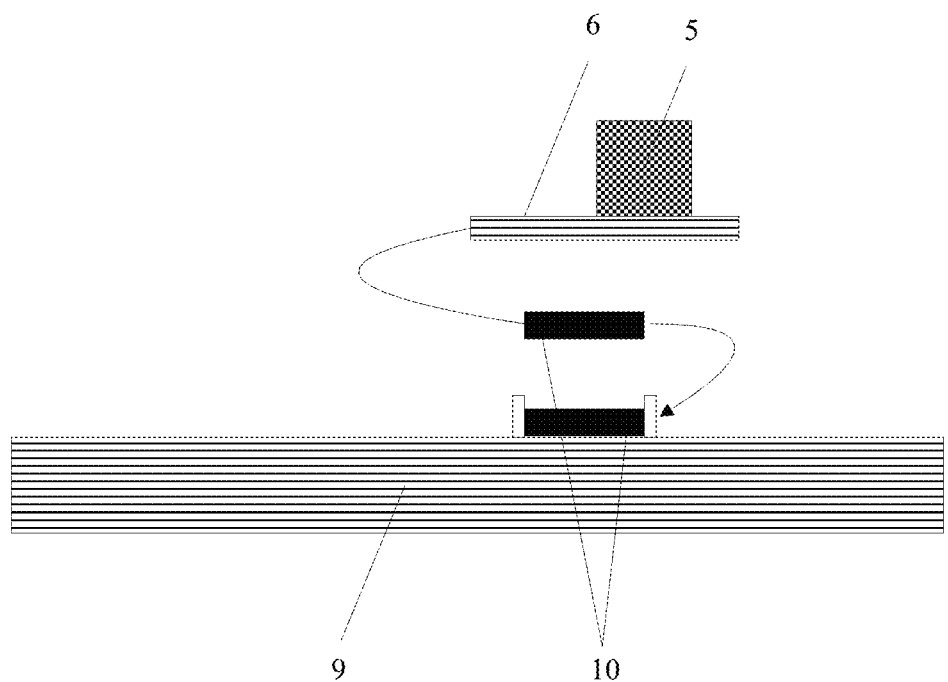
FIG. 2 is a schematic diagram of a connection between a circuit board and a main board according to an embodiment of this disclosure.

For better understanding of the electrical connection between the circuit board 6 and the main board 9, reference may be made to FIG. 2. FIG. 2 is a schematic diagram of a connection between a circuit board and a main board according to an embodiment of this disclosure. It can be seen from FIG. 2 that the circuit board 6 is connected to the main board 9 through the connector 10 (which is a board-to-board connector in this case), and the circuit board 6, the main board 9, and the infrared sensor remain connected to each other, so that the infrared sensor can be controlled through the main board 9.

Optionally, a width of the second gap is greater than or equal to a width of the first gap.

In this implementation, because the photosensitive device 5 is arranged in the second gap, setting the width of the second gap to a relatively large value can better accommodate the photosensitive device 5, such as the infrared sensor. The first gap is a gap between the display screen 2 and the edge frame 4. Setting the width of the first gap to a relatively small value can enhance visual appeal without affecting a full-screen display design, so that the mobile terminal can have a relatively high screen-to-body ratio. Optionally, the width of the first gap may be set between 0.3 mm and 1 mm to achieve a visual effect of full-screen display.

Optionally, the optical channel is provided with a light absorbing layer.

In this implementation, the optical channel is provided with the light absorbing layer that absorbs light. Black ink can be sprayed on an inner wall of the optical channel, or a black material can be directly used as an inner wall of the optical channel, so that the optical channel is provided with the light absorbing layer that absorbs light. In this way, strong reflection in the optical channel can be prevented from affecting performance of the photosensitive device 5 (for example, the infrared sensor).

Optionally, the infrared sensor includes a strip-shaped packaging shell 53, the transmit end 51 is arranged at one end of the strip-shaped packaging shell 53, and the receive end 52 is arranged at the other end of the strip-shaped packaging shell 53.

Figure 3:
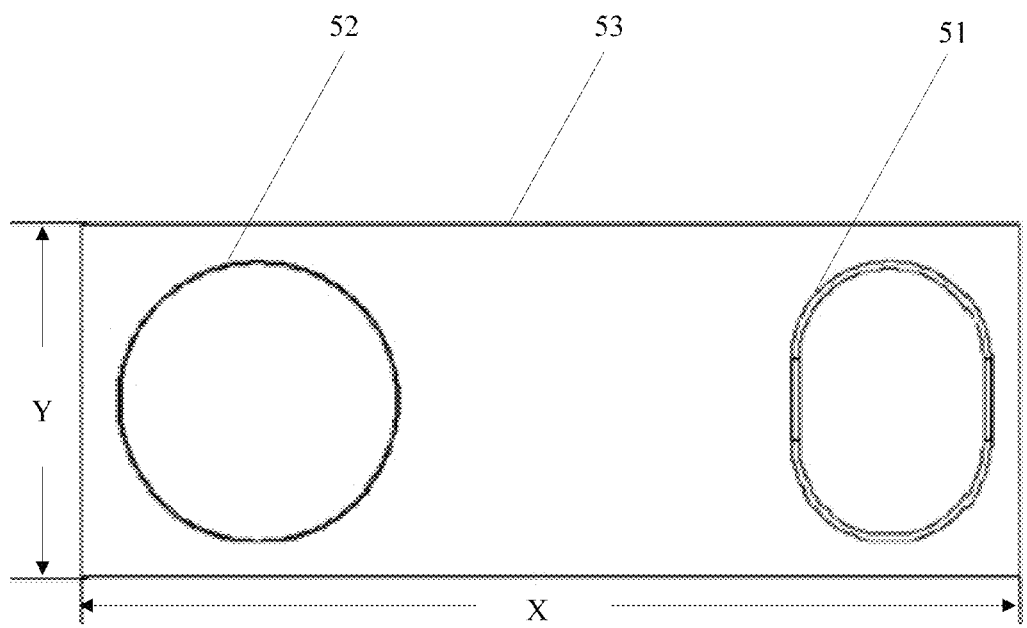
FIG. 3 is a schematic structural diagram of an infrared sensor according to an embodiment of this disclosure.

In this implementation, for better understanding of the foregoing structure, reference may be made to FIG. 3. FIG. 3 is a schematic structural diagram of an infrared sensor according to an embodiment of this disclosure. It can be seen in FIG. 3 that X represents a long side of the infrared sensor, and Y represents a short side of the infrared sensor. A sensing area inside the infrared sensor is arranged horizontally, that is, arranged in an X direction. The strip-shaped packaging shell 53 is made into a thin and long shape to shorten Y as much as possible. This design not only ensures small stacking space in a Y direction, but also maintains sensitivity of the infrared sensor itself. A circle ring in FIG. 3 represents the receive end 52 of the infrared sensor, and an oval ring represents the transmit end 51 of the infrared sensor.

A mobile terminal according to an embodiment of this disclosure includes a cover plate 1, a display screen 2, a middle frame 3, an edge frame 4, and a photosensitive device 5. The cover plate 1 is fixedly connected to the edge frame 4, the display screen 2 is located between the cover plate 1 and the middle frame 3, a first gap is provided between the display screen 2 and the edge frame 4, a second gap is provided between the middle frame 3 and the edge frame 4, and the first gap and the second gap are connected to form an optical channel for the photosensitive device 5. In this way, due to existence of the optical channel, the photosensitive device 5 does not need to be arranged on the front side of the mobile terminal, so that a screen-to-body ratio of the mobile terminal can be increased.

It should be noted that the terms "include", "comprise", or any of their variants are intended to cover a non-exclusive inclusion, such that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude the existence of other identical elements in the process, method, article, or apparatus that includes the element.

The embodiments of this disclosure are described above with reference to the accompanying drawings, but this disclosure is not limited to the foregoing implementations. The foregoing implementations are only illustrative rather than restrictive. Inspired by this disclosure, a person of ordinary skill in the art can still derive many variations without departing from the essence of this disclosure and the protection scope of the claims. All these variations shall fall within the protection of this disclosure.

What is claimed is:

1. A mobile terminal, comprising a cover plate, a display screen, a middle frame, an edge frame, and a photosensitive device, wherein the cover plate is fixedly connected to the edge frame, the display screen is located between the cover plate and the middle frame, a first gap is provided between the display screen and the edge frame, a second gap is provided between the middle frame and the edge frame, and the first gap and the second gap are connected to form an optical channel for the photosensitive device;
wherein the photosensitive device is arranged in the second gap, and a width of the second gap is greater than a width of the first gap.

2. The mobile terminal according to claim 1, wherein the photosensitive device is an infrared sensor, a transmit end and a receive end of the infrared sensor face the cover plate, and an infrared ray emitted by the infrared sensor is emitted out of the cover plate through the optical channel.

3. The mobile terminal according to claim 2, wherein the edge frame is provided with a first step structure, the cover plate is bonded to the first step structure through an adhesive layer, and the adhesive layer comprises a first side and a second side that are arranged oppositely, wherein the second side is a side close to the display screen, and the first gap is located between the second side and the display screen.

4. The mobile terminal according to claim 2, wherein the mobile terminal further comprises a circuit board, the infrared sensor is electrically connected to the circuit board, and the circuit board is fixedly connected to the middle frame and the edge frame.

5. The mobile terminal according to claim 4, wherein the edge frame is provided with a second step structure, the circuit board is fixedly connected to the second step structure, and the circuit board is fixedly connected to a side, facing away from the display screen, of the middle frame.

6. The mobile terminal according to claim 4, wherein the infrared sensor is welded to the circuit board, and the circuit board is electrically connected to a main board.

7. The mobile terminal according to claim 6, wherein the circuit board is electrically connected to the main board through a connector or an elastic sheet.

8. The mobile terminal according to claim 1, wherein an inner wall of the optical channel is provided with a light absorbing layer.

9. The mobile terminal according to claim 8, wherein the light absorbing layer is made of black ink, or the optical channel is made of a black material.

10. The mobile terminal according to claim 2, wherein the infrared sensor comprises a strip-shaped packaging shell, the transmit end is arranged at one end of the strip-shaped packaging shell, and the receive end is arranged at the other end of the strip-shaped packaging shell.

11. The mobile terminal according to claim 10, wherein a sensing area inside the infrared sensor is arranged along a longitudinal direction of the strip-shaped packaging shell.

\* \* \* \* \*